Figure 1:
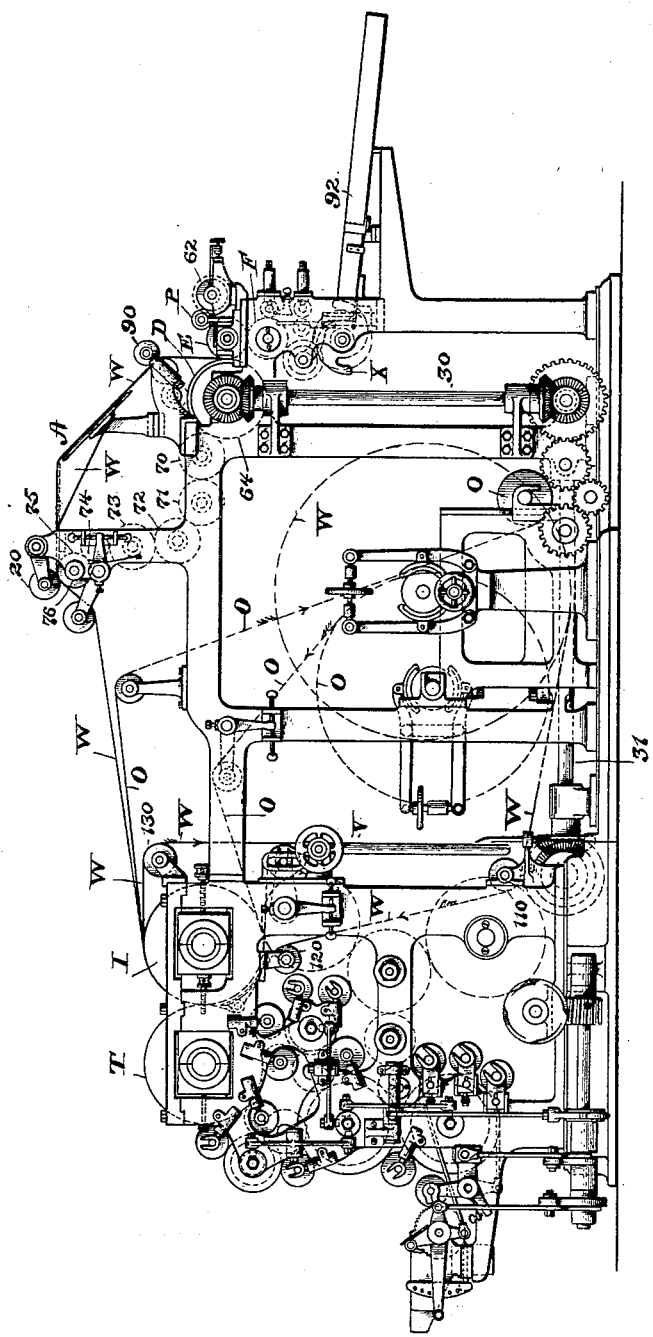

No. 630,937. Patented Aug. 15, 1899.
E. P. SHELDON.
CUTTING, FOLDING, AND PASTING MACHINE.
(Application filed June 29, 1898.)

(No Model.) 9 Sheets—Sheet 1.

No. 630,937. Patented Aug. 15, 1899.
E. P. SHELDON.
CUTTING, FOLDING, AND PASTING MACHINE.
(Application filed June 29, 1896.)
(No Model.) 9 Sheets—Sheet 2.

No. 630,937. Patented Aug. 15, 1899.
E. P. SHELDON.
CUTTING, FOLDING, AND PASTING MACHINE.
(Application filed June 29, 1896.)
(No Model.) 9 Sheets—Sheet 3.

No. 630,937. Patented Aug. 15, 1899.
E. P. SHELDON.
CUTTING, FOLDING, AND PASTING MACHINE.
(Application filed June 29, 1896.)

(No Model.) 9 Sheets—Sheet 4.

Attest
W. A. Smith
Geo. H. Botts

Inventor
E. P. Sheldon
by Philip L. Munson & Phelps
Att'ys

No. 630,937. Patented Aug. 15, 1899.
E. P. SHELDON.
CUTTING, FOLDING, AND PASTING MACHINE.
(Application filed June 29, 1896.)
(No Model.) 9 Sheets—Sheet 5.
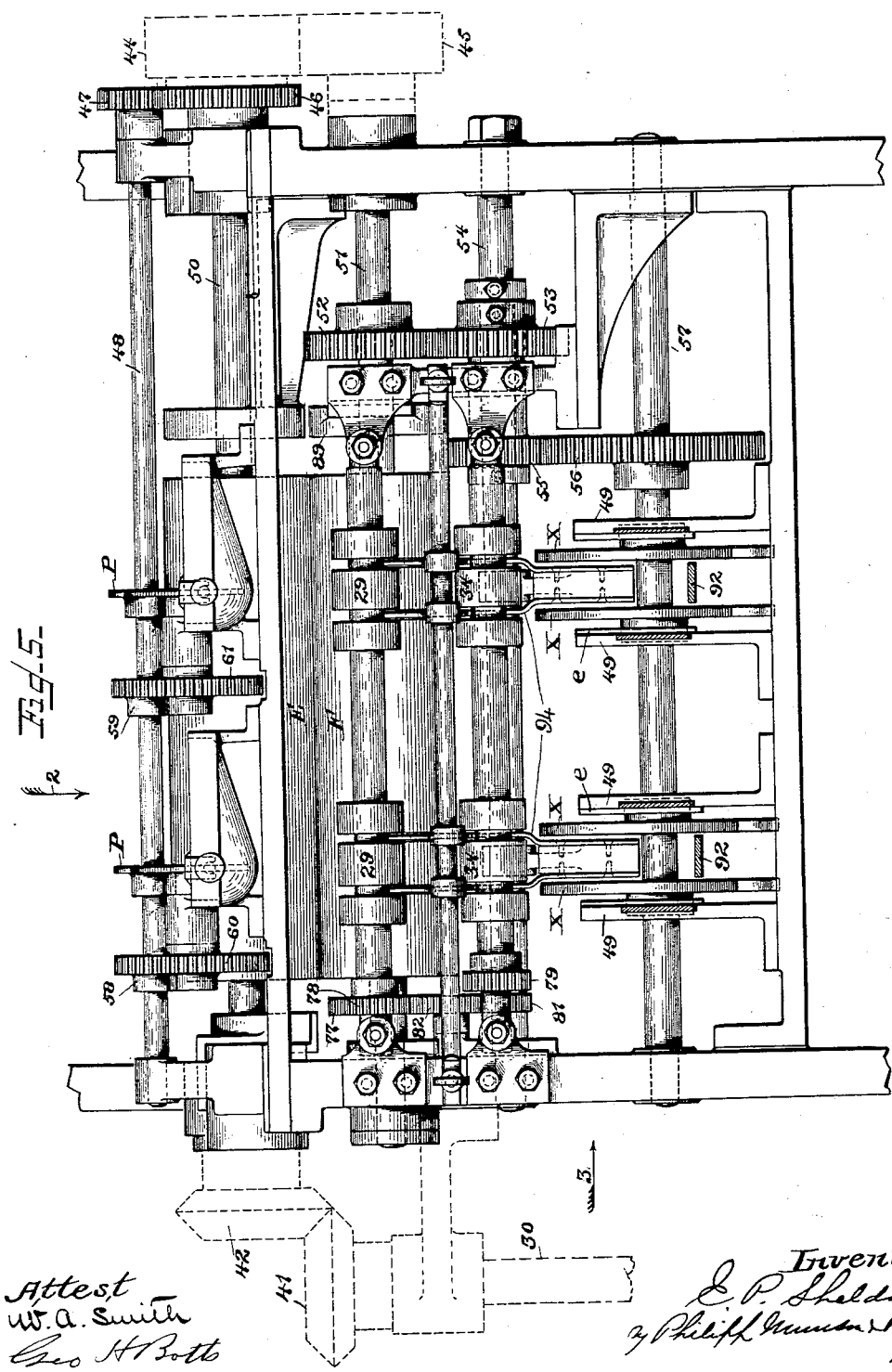

No. 630,937. Patented Aug. 15, 1899.
E. P. SHELDON.
CUTTING, FOLDING, AND PASTING MACHINE.
(Application filed June 29, 1896.)
(No Model.) 9 Sheets—Sheet 6.
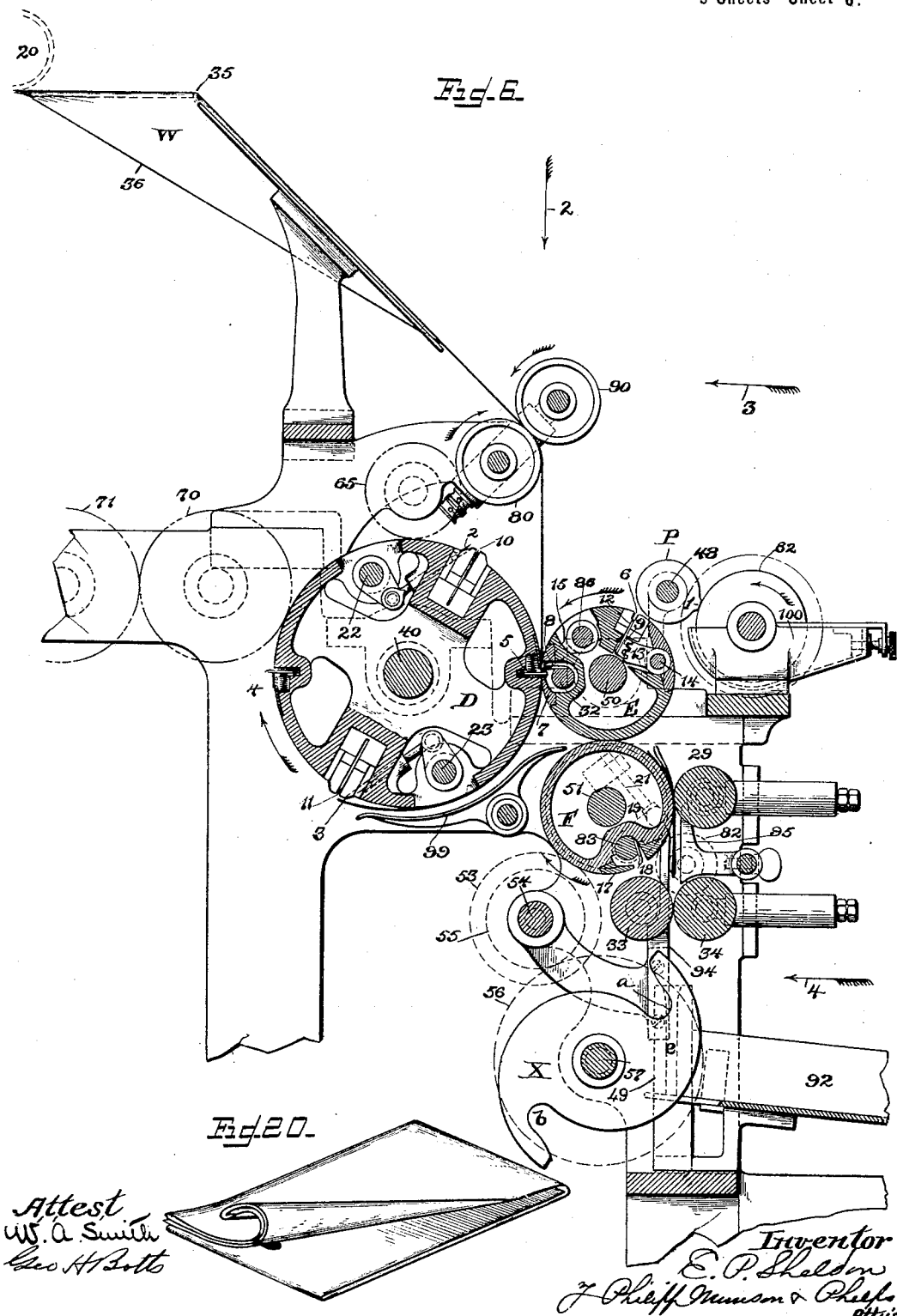

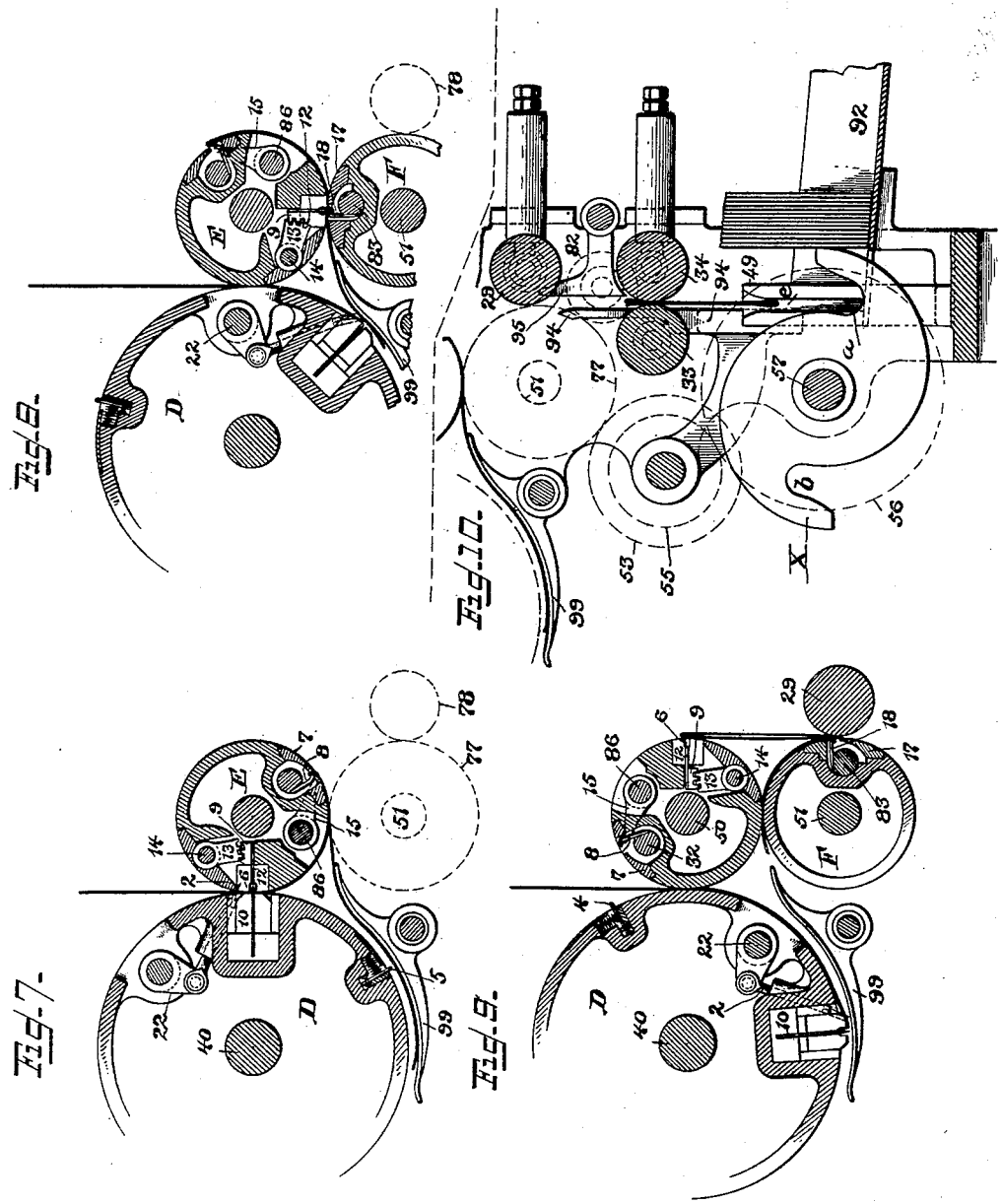

No. 630,937. Patented Aug. 15, 1899.
E. P. SHELDON.
CUTTING, FOLDING, AND PASTING MACHINE.
(Application filed June 29, 1896.)
(No Model.) 9 Sheets—Sheet 8.
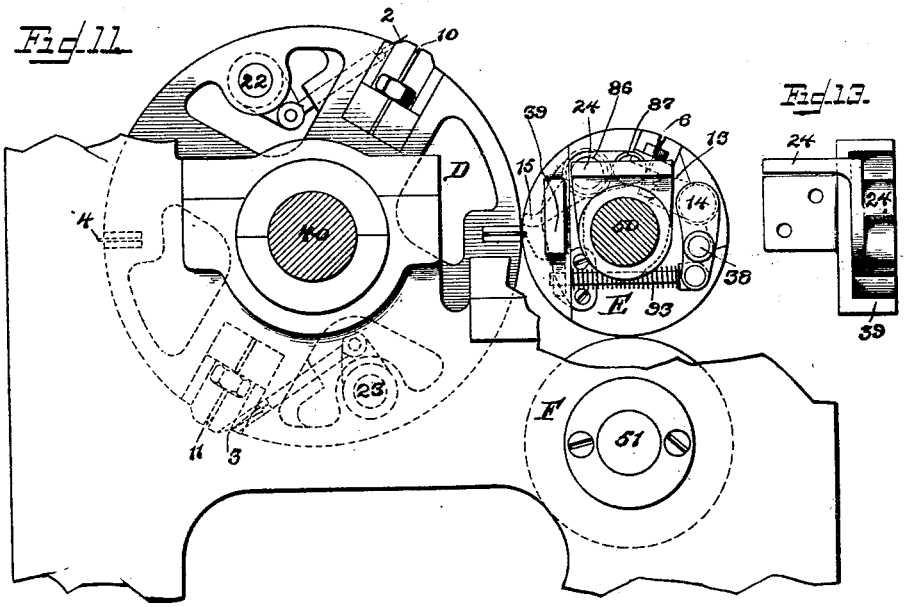
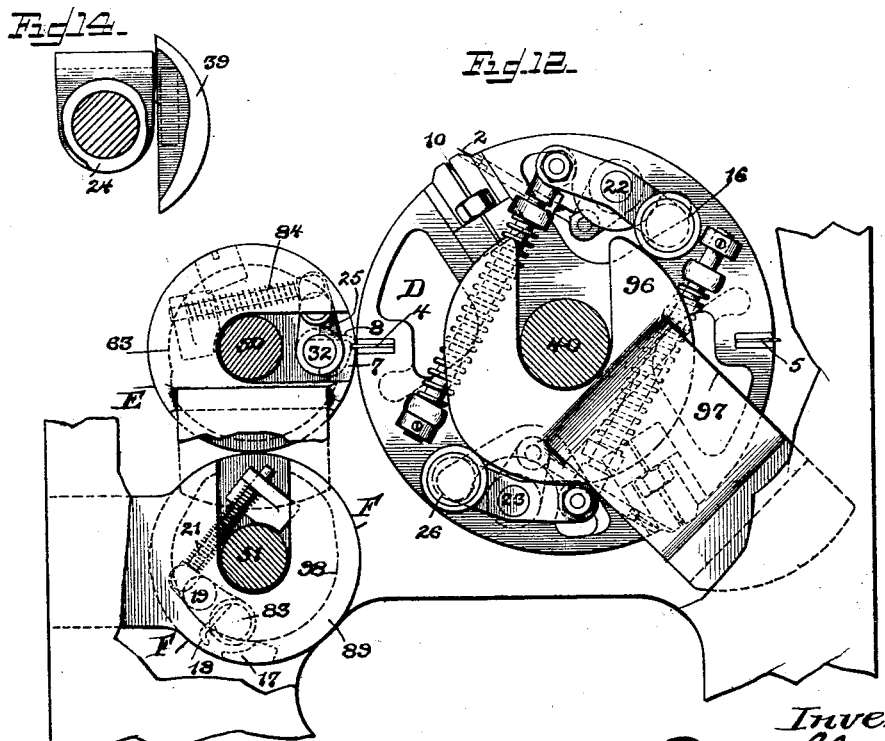

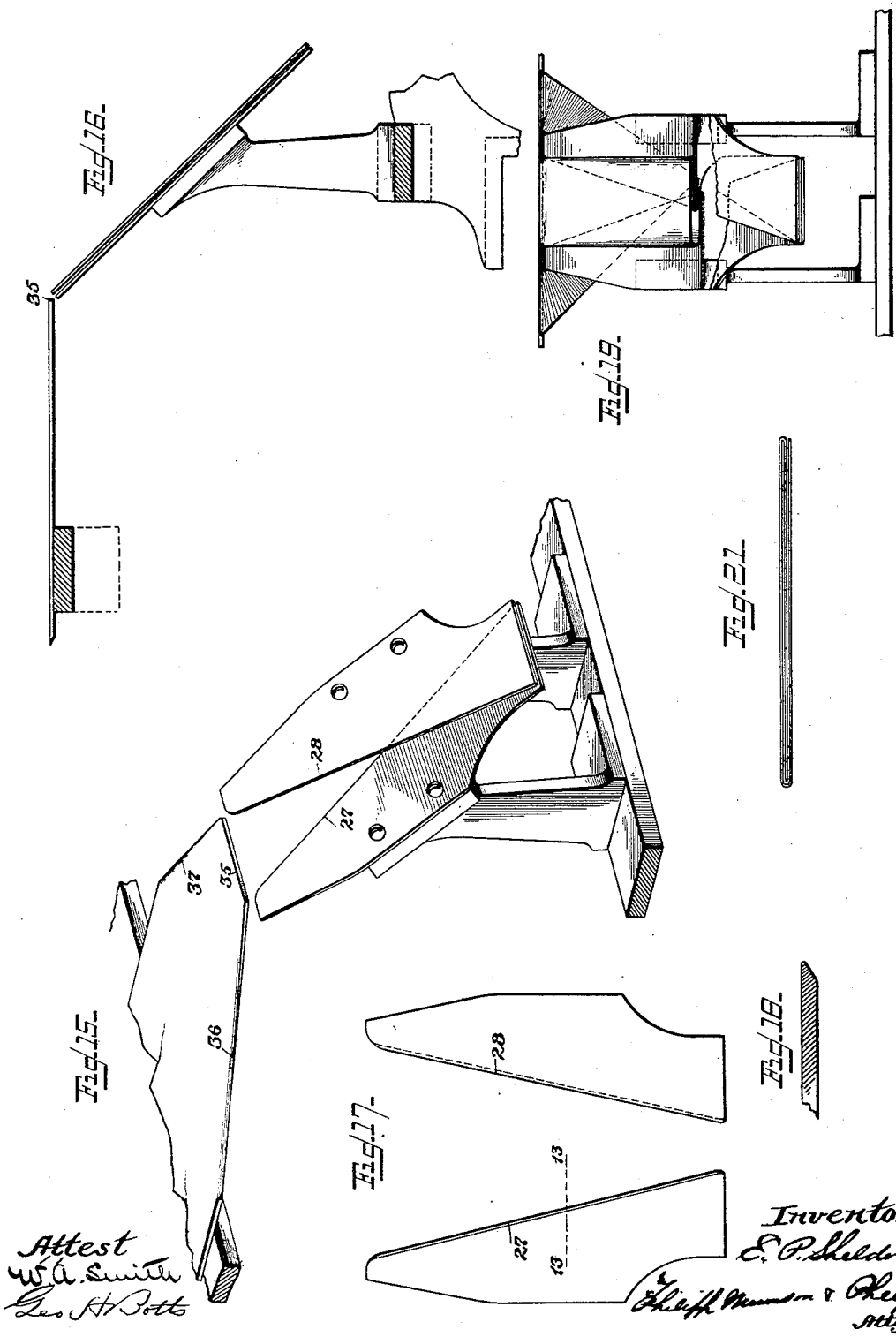

United States Patent Office.

EDWARD P. SHELDON, OF NEW YORK, N. Y., ASSIGNOR TO ROBERT HOE, THEODORE H. MEAD, AND CHARLES W. CARPENTER, OF SAME PLACE.

CUTTING, FOLDING, AND PASTING MACHINE.

SPECIFICATION forming part of Letters Patent No. 630,937, dated August 15, 1899.

Application filed June 29, 1896. Serial No. 597,325. (No model.)

*To all whom it may concern:*

Be it known that I, EDWARD P. SHELDON, a citizen of the United States, residing at New York, (Brooklyn,) county of Kings, and State of New York, have invented certain new and useful Improvements in Cutting, Folding, and Pasting Mechanism, fully described and represented in the following specification and the accompanying drawings, forming a part of the same.

The object of this invention is the making of a folded product consisting of a sheet whose sides and ends are each infolded twice in opposite directions onto the same side of its body, preferably, but not necessarily, equally, and preferably, but not essentially, having the inversely-folded parts more or less overlapped, and, in a modified form, such a sheet with the described side folds omitted.

The invention includes, first, a rotative mechanism consisting of two sets of coacting folding instrumentalities whereby two transverse folds are imparted to a sheet and a cutting mechanism in such relation thereto that a web is severed transversely and has its front and rear ends lapped inwardly or toward each other on the same side of its body; second, in combination therewith a longitudinal folder whereby the sides of said sheet are primarily infolded upon its body; third, in combination with either of the foregoing a rotary printing mechanism with the form-bearing portions of its form-cylinders so related to the rotative folding mechanism as to correctly imprint the said sheets, and, fourth, in combination with the rotative folding mechanism of a pasting mechanism whereby the folded laps may be secured together.

This invention is hereinafter particularly described, aided by one embodiment of it illustrated by the accompanying drawings, in which—

Figure 2:
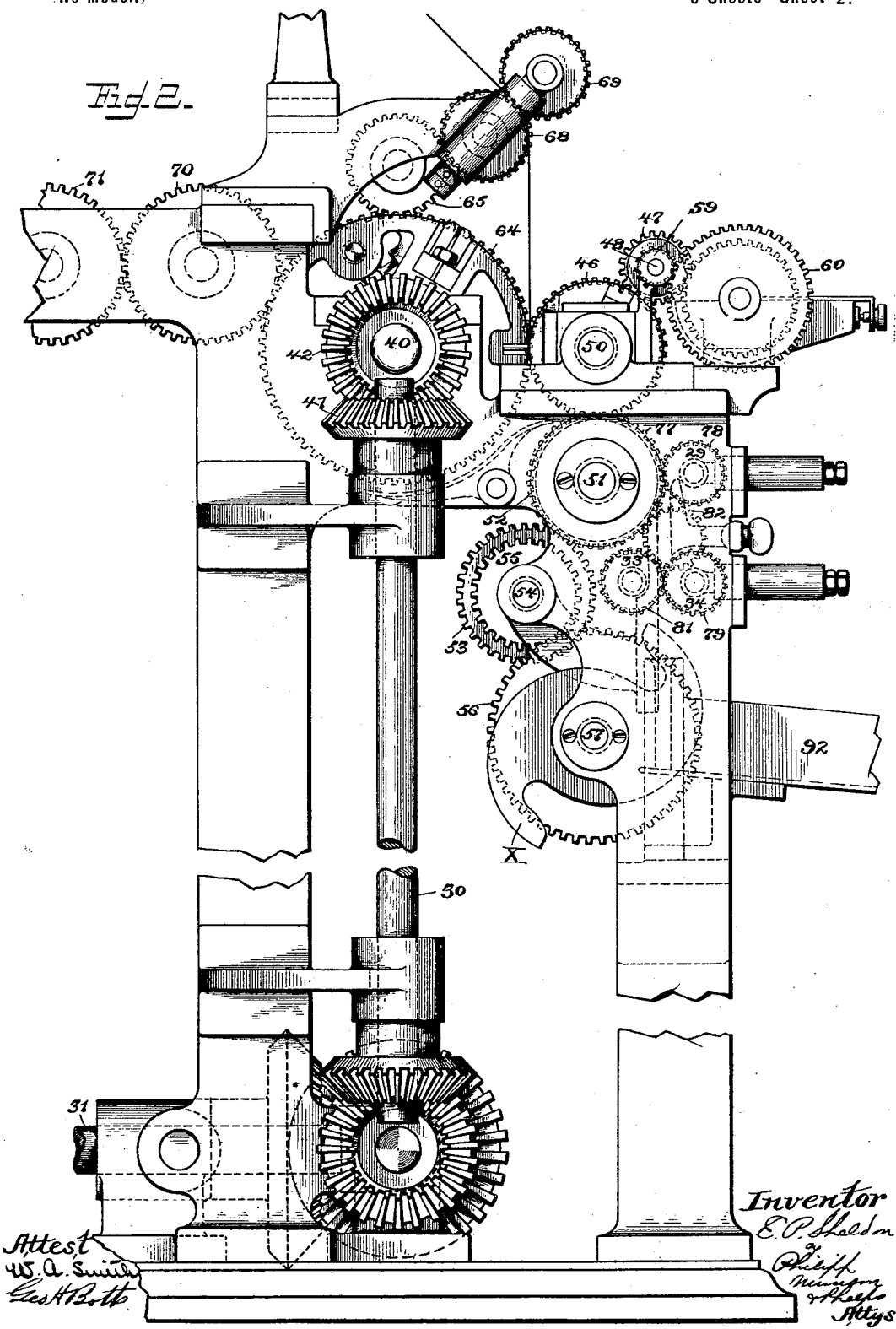
Figure 3:
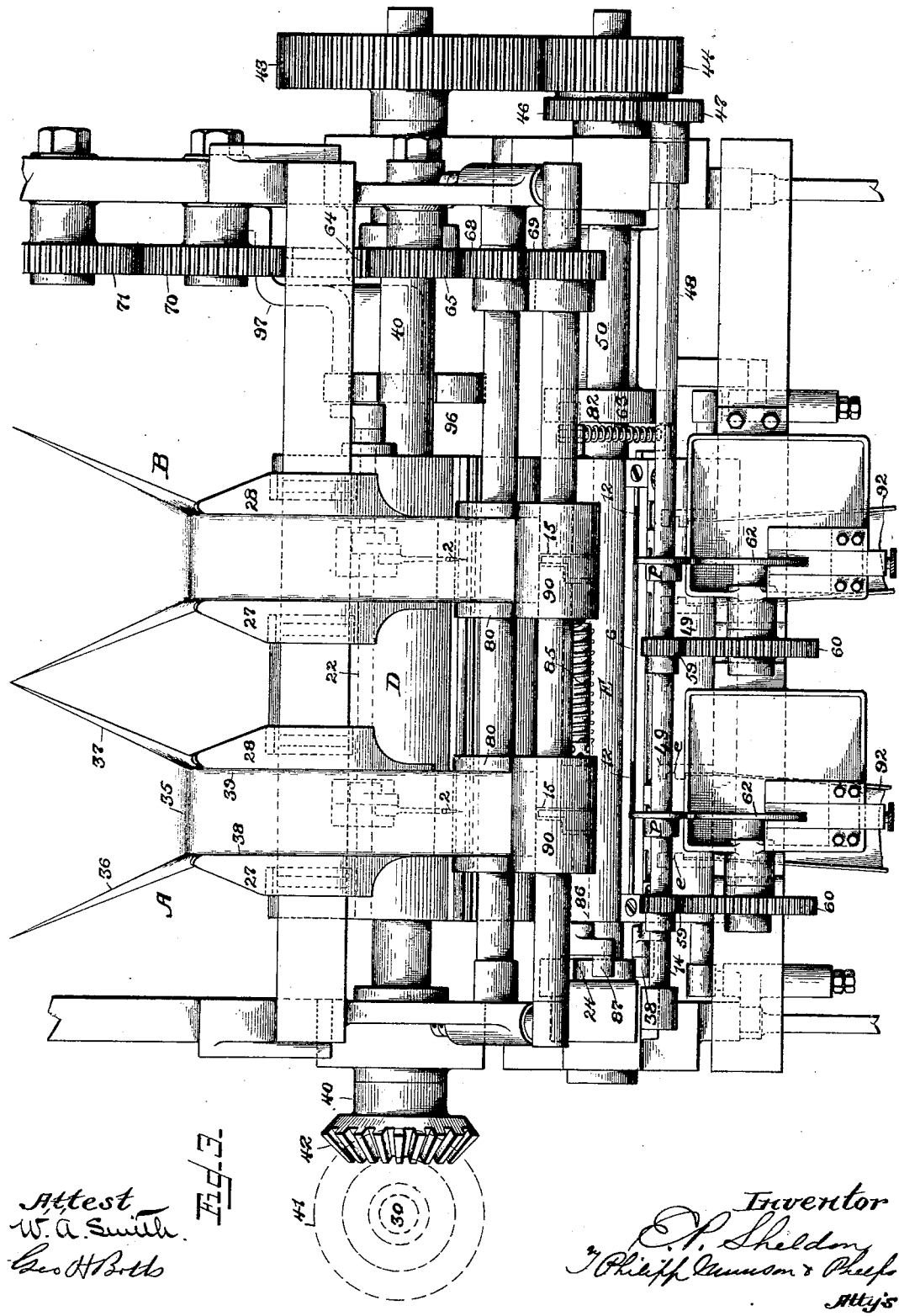
Figure 4:
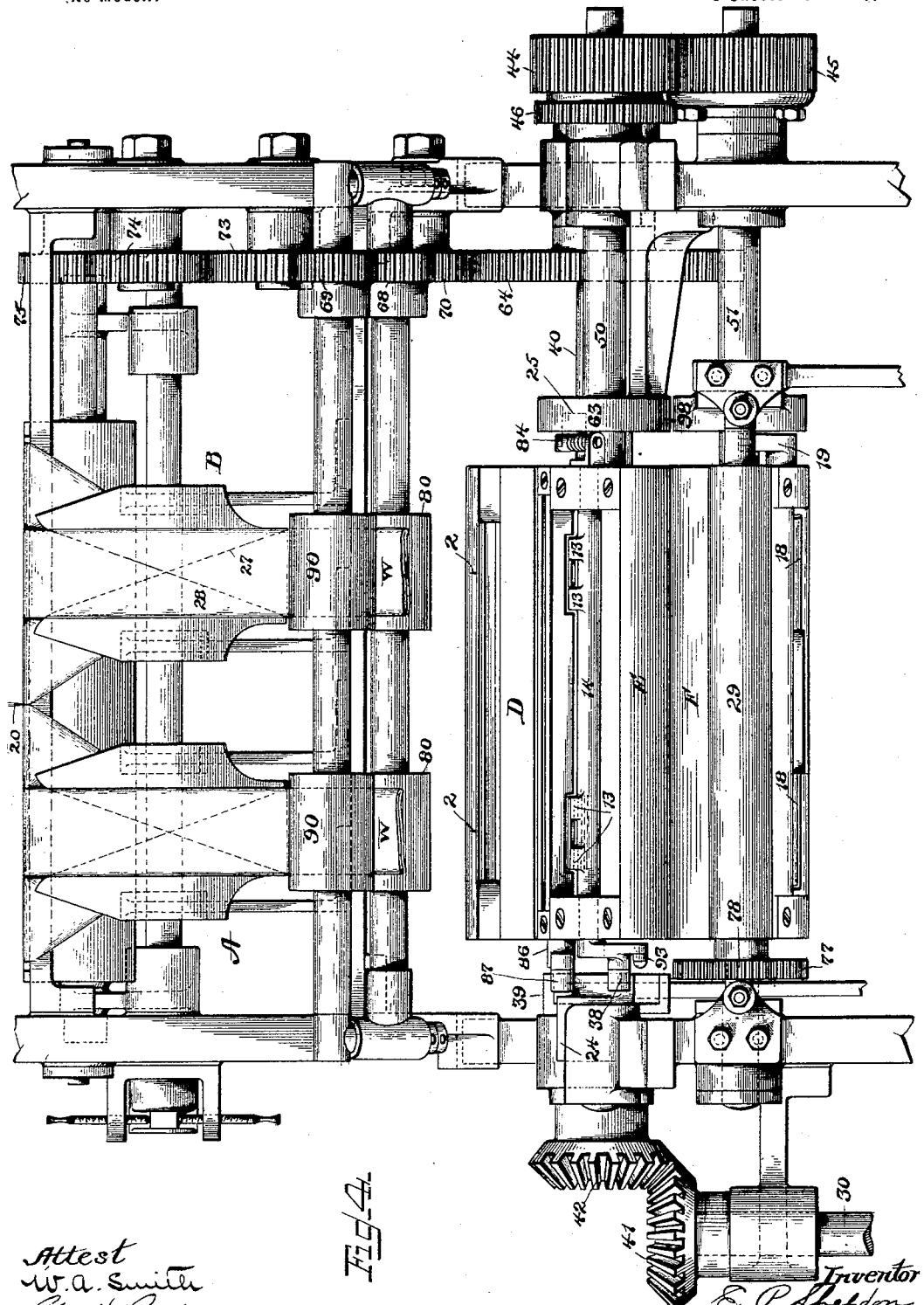

Figure 1 represents a side elevation of a web-printing machine and its delivery apparatus embodying this invention. Fig. 2 is an enlarged side elevation of the delivery apparatus detached from the printing-machine. Fig. 3 is a plan view of said delivery apparatus as seen looking in the direction of the arrow 2 in Fig. 5. Fig. 4 is an end elevation of the delivery apparatus, the delivery-rollers and rotary fly and their associated parts being omitted. Fig. 5 is a like end elevation as seen looking in the direction of the arrow 4 in Fig. 6, with the longitudinal folders omitted. Fig. 6 is a vertical sectional elevation of the delivery apparatus as seen looking in the direction of the arrow 3 in Fig. 5, taken through the center of the longitudinal folders. Figs. 7, 8, and 9 are sectional elevations of the rotary folding mechanism, showing the parts in different positions of their action. Fig. 10 is a sectional elevation of the final-delivery or sheet-laying mechanism. Fig. 11 is an enlarged elevation of the front end of the cutting folding-cylinders, showing more particularly the cam motions. Fig. 12 is a similar rear end elevation. Figs. 13 and 14 are elevations of detached cams. Figs. 15 to 19, inclusive, illustrate the longitudinal folder removed from the machine, Fig. 15 being a perspective view, Fig. 16 a side elevation, Fig. 17 the side folders detached, Fig. 18 a sectional view of one of them on the section line 13 of Fig. 17, and Fig. 19 an end elevation of the folder with its body broken away, so as to illustrate in section the condition of the folded material at a point part way of its passage over the folder. Fig. 20 is a perspective view, and Fig. 21 a sectional view, of the folded product.

It is to be understood that this delivery apparatus is adapted to form a part of any type of printing-machine whereby a web is perfected. For the better elucidation of the present improvements they are shown in Fig. 1 as combined with a web-printing machine of that type known as a "double-ender," in which the web W, led from a roll, is guided over rollers 110 120 and passed between the type-cylinder T and impression-cylinder I, at one end thereof, and thus printed upon one side is led over a roller 130 and around a V-shaped transferrer and reverser, thence again between the type and impression cylinders, but at the other end thereof, whereby it is perfected by being printed on its second side. To prevent offset upon the impression-cylinder from the first printed side of this web, it is accompanied in its second passage through the printing-couple by an offset web O. This perfected web (marked W) is shown as entering into this delivery apparatus by passing over a roller 76, which is surmounted by a slitting-disk 20, whereby said web is divided longitudinally into two webs. This delivery apparatus embodies a pair of longitudinal folders A B, the structure of which is more particularly hereinafter described, a rotary folding and cutting mechanism, the devices of which are carried, respectively, by cylinders D E F, and a sheet-laying device consisting of a rotary fly, said cylinders D E F being of double length, so as to operate upon half-webs, into which the main web is divided by said slitter 20, and the rotary flies and other parts are duplicated where necessary to act upon the two products that are formed side by side in the machine. This delivery mechanism is driven at proper speed by means of a vertical counter-shaft 30, which derives its motion through beveled gears from a longitudinal shaft 31, that is driven from the printing-machine. The shaft 40 of the cylinder D is driven from said shaft 30 by means of beveled gears 41 42, and on the opposite end of said shaft 40 is carried, outside of the frame, a wheel 43, which drives a pinion 44 on the shaft 50 of the cylinder E, and this pinion 44 gears with a pinion 45 on the shaft 51 of the cylinder F. The shaft 51 also carries within the side frame a wheel 52, which meshes with an intermediate wheel 53 on a shaft 54, that carries farther within the side frame a pinion 55, which meshes with a wheel 56 on the fly-shaft 57. The shaft 50 also carries near to the pinion 44 a pinion 46, which drives a pinion 47 on the paster-shaft 48, and this shaft 48 through pinions 58 59 and wheels 60 61 revolves the paste-fountain disks. The shaft 40 of cylinder D carries within the side frame a wheel 64, which through an intermediate 65 drives the pressing-rollers 80 90, which are geared together by intermeshing pinions 68 69, the pinion 68 gearing with the pinion 65. This wheel 64 also drives the web-roller 76 through a train of gears 70, 71, 72, 73, 74, and 75. The cylinder F carries at one end a wheel 77, which through a pinion 78 drives the pressing-roller 29, and the delivery-rollers 33 34 are geared together by pinions, only one of which, 79, is shown, and these rollers are driven by means of a pinion 81 on the shaft of roller 33, that gears with the intermediate 82 from the wheel 77.

The longitudinal folders A B in a general sense are of the type illustrated and described in Patent No. 383,798. Each consists of a horizontal plate which is formed to provide three internal guides 35, 36, and 37. The guide 35 is formed by the foremost edge of the plate and is of a length equal to the width of that of the ultimately longitudinally-folded product, and the guides 36 37 extend rearwardly from the ends of the guide 35, respectively, at angles diverging to the rear edge of the plate, where it is of a width equal to that of the outspread or unfolded web. Of course these internal guides might be formed by bars, but the plate structure is preferable. The external turners consist of guides 27 28, that are inclined obliquely downwardly and forwardly from the internal guide 35, and though closely superposed they are relatively arranged across each other at acute angles in the path of the two sides of the web, so that they operate to lap the sides of the web that project outwardly beyond the ends of the guide 35 successively inward over the central portion of the web and so that the sides thereof are infolded, and preferably so that one side overlaps the other side, and preferably so as to form three plies of equal extent. These guides, as illustrated, are preferably the inner edges of plates obliquely arranged with respect to the plate forming the internal guides, but might, of course, be bars, if desired. The plate structure for both the internal and external guides is preferred, because it affords an easy means for securing the same in position. The coöperation of the three internal guides and the two external guides results in folding the web upon two longitudinal lines defined at the ends of the guide 35, the guide 27 turning one side inwardly and the guide 28 turning the opposite side inwardly, thus lapping the web on two parallel lines inwardly, the two sides being lapped in succession one onto the other in three plies, as is seen in Fig. 4, where the folded web W is shown as broken away. It may now be remarked, as is shown in the Patent No. 383,798, that the arrangement of these five guides constituting the folder may be such as to lap the outer portions of the web upon one another to a less extent than a folder which will produce three equal laps, as shown, and this lateral lapping of the sides may be in such a relation to the central part of the web as to cause the side laps simply to meet, and thus form two plies, or, if desired, it may leave their edges nearly together, but not in contact, according as is preferred. The longitudinally-folded web thus produced has its folds laid in passing between the rollers 80 90, preferably spring-seated, which act as fold-laying or pressing rollers and as feeding-rollers. These rollers are geared together by toothed wheels 68 69 and driven by an intermediate 65 from the toothed wheel 64 on the shaft of the cylinder D. As only one longitudinal folder has been described, it may be remarked that two folders precisely alike are provided, so as to operate upon two narrow webs, and that a wide web W, received from the printing-machine, is fed over a roller 76 and slit into two webs by means of the disk slitter 20, that coöperates with said roller for that purpose. These two webs are then passed to the longitudinal folders A and B and are each respectively of a width equal to the rear edges of these folders. Each double longitudinally folded and lapped web passes from the longitudinal folders to and between the cylinders D E.

The cylinders D E F and their accessories constitute a rotating, cutting, and folding apparatus provided with mechanisms that capacitate it to cut a web transversely into length and to fold the same transversely in such manner as to lay the folds toward each other, and it may, and preferably will be, one upon the other, thus producing a three-ply product. The cylinder D is preferably circumferentially twice the length of the unfolded product to be produced and is provided with cutting-blades 10 11, mounted at opposite points in said cylinder, and rearwardly of each of these blades there are provided sheet-impaling pins 2 3. These pins project through tangentially-arranged guideways in the body of cylinder D, and they are respectively pivoted to rock-arms that are fast to rock-shafts 22 23, which are spring-seated, so as to normally hold the pins protruded from the cylinder (see Fig. 12) and suitably rocked to withdraw said pins by means of rock-arms 16 26, that contact with a cam 96, that is held stationary by means of a bracket 97, fixed to the side frame. (See Fig. 3.) This cylinder D is also provided with tucking-blades 4 5, which are situated diametrically opposite one another and circumferentially one-third the distance between the cutting-blades 10 11 in the direction in which said cylinder travels, and these tucking-blades are so secured in sockets in the cylinder D and seated upon springs therein as to be capable of slight circumferential play, whereby the changing angular relation of their edges with relation to the nipping-jaws 7, carried on the folding-cylinder E, prevents their acting as cutting devices upon the fold of the paper, which might result from the shearing action which they would otherwise have. The springs are located on the rear side of the tucking-blade, the front side of the blade being considered as that side which is first presented to the nipping-jaws as the cylinder rotates. This location of the springs enables the blade to have a circumferential movement or play as the blade enters between the nipping-jaws. It is essential in order to avoid the shearing action which it is desired to avoid that the springs be located on this side of the blade. This cylinder D may, if desired, be provided with a conductor 99, arranged near its surface, for the guidance of the sheet when detached from the holding-pins. The cylinder E is equal circumferentially to the length of the unfolded product, being of half the size of the cylinder D. This cylinder E is provided with a cutting-slot 6, formed in a box, as is common, which cutting-slot 6 coöperates with the cutting-blades 10 11, that have elastic side pieces to hold the paper while being cut, as is usual.

The first-folding mechanism, or "folding device," properly so called, to act upon the sheet and by which the first fold therein is produced is the cylinder E. This cylinder is provided with a fixed nipping-jaw 7 and a movable nipping-jaw 8. The movable jaw 8 is mounted upon a rock-shaft 32 and normally is held closed by means of a spring-rod 84, attached to its rock-arm 25. This shaft 32 is suitably rocked at timely intervals by means of a cam 63, Figs. 4 to 12, with which the roll of the rock-arm contacts, to open said jaw. When the jaw 8 is open, the paper is suitably presented to the folding-cylinder E by being tucked between the jaws 7 and 8 by the tucking-blades 4 and 5 on the cylinder D. When the paper has been tucked between the jaws, the conformation of the cam 63 allows the movable jaw 8 to be closed by its spring-rod. The paper is then seized and firmly held by the jaws and being now under the control of the folding-cylinder is carried onward thereby and the first fold is formed. After the fold is formed the cam 63 again operates the movable jaw 8 to release the folded paper. This folding-cylinder is also provided with a tucking-blade 12, that reciprocates in a guiding-recess formed through the block in which the cutting-slot 6 is formed and has such a range of movement as to clear said slot and provide for its proper performance of the cutting action and yet be protruded beyond the surface of cylinder E for performing its tucking operation. For reciprocating this tucking-blade 12, which normally is held inwardly by means of a spring-rod 93, it is provided with a rack 9, that coöperates with a segment 13, projecting from a shaft 14, suitably rocked by a rock-arm 38, contacting with a fixed cam 39. This cylinder is, furthermore, provided with a paste receiving and applying arm 15, that projects from a rock-shaft 86, that has a rock-arm 87, which is actuated by a fixed cam 24, which encircles the shaft of the carrier C. The paste-applying arm 15 is normally held within the cylinder E and somewhat within its periphery by means of the spring 85, attached to the shaft 86 and acting to so rotate the shaft as to accomplish this purpose. Its actuating-cam 24 is so shaped that it projects the arm 15 flush with the periphery of the cylinder at suitable times that it may receive a film of paste thereon and be then withdrawn within the cylinder E and again be protruded therefrom at the proper time to apply the paste it carries in a spot upon the folded product, as will be hereinafter explained. For coöperation with this paste-arm 15 in the cylinder E and for the purpose of providing the material for such spot that is to be deposited upon the product there is arranged in proper coöperative position a rotating paster P, the single projecting part 1 of which moves in a circular path that enables it to contact with and deposit paste upon the paste-arm 15, which latter operates to transfer the paste in a spot on the partially-folded product. This paster P receives its charge of paste by contact with a fountain-disk 62, that rotates in a paste-fountain 100.

After the first fold has been formed in the paper by the folding mechanism hereinbefore described and the paste has been applied thereto by the pasting devices the paper passes to the control of the "second folding mechanism," properly so called, which is the cylinder F. This cylinder F is provided with a fixed nipping-jaw 17 and a movable jaw 18, projecting from a shaft 83, which carries outside the cylinder a cross-head 19, that has one end attached to a spring-rod 21, whereby the said jaw 18 is normally held closed, and which cross-head has a stud or bowl contacting with a cam 98, whereby said jaw is operated at proper times. Coöperating with this cylinder F for laying the plies of the folded product together after the fold has been made is the spring-seated pressing-roller 29, and beneath this cylinder F and roller 29 are situated the delivery-rollers 33 34, which receive the folded sheet and convey it, guided by the conductors 94, into the recesses $a$ $b$ of the rotary fly X and into fixed and vertically facing slots $e$ of the guides 49. (See Fig. 3.) The recesses $a$ $b$ are cut into the rotary fly in such a manner that they leave projecting outwardly from them arms of such width as to form propellers acting to thrust the sheet forward from out of the slots $e$ of the guides 49 into the packing-chute 92. The web of paper led from a printing mechanism or other source of supply passes under the slitter 20, where it is divided into two half-webs, which respectively pass over the longitudinal folders A and B, where each receives a double longitudinal fold, as hereinbefore described.

It will of course be understood that two half-width webs may be fed to the folding mechanism before described, in which case the slitting devices will be omitted. It is also to be understood that sheets of the proper length may be fed to the folding devices instead of webs, should this be thought desirable.

As the manipulation of both the webs is the same, a description of the operation in connection with but one will now be given. The double longitudinally-folded web passes from between the pressing and fold-laying rollers 80 90 down to and between the cylinders D E. Its leading end is caught upon the pin, say 3, and by it the web is carried around upon the surface of the cylinder D, preferably two-thirds of the length of the product to be made, when the forward end is released by the cam operating said pin 3 to withdraw it. Simultaneously or about simultaneously therewith the tucking-blade 5 will have pressed the body of the web on a transverse line toward the cylinder E and tucked the same within the nip of the spring-seated jaw 8 and its fixed companion 7, as in Fig. 6. The cylinders D E continuing to revolve, the web nipped by the jaws 7 8 will then follow the periphery of the cylinder E, as in Fig. 7, and the first fold will be formed. When these cylinders have revolved far enough to bring the cutting-blade 10 and cutting-slot 6 into coaction, as in Fig. 7, which will in the illustrated case be at a point rearward of the first fold a distance preferably equal to one-third the length of the unfolded product, the web will be severed transversely thereby and the newly-formed end of the web will be impaled by the pin 2, and the new leading end of the web thus held will follow the periphery of the cylinder D, as in Fig. 9. When the cylinder E has revolved far enough to lay the forward or first folded part of the web upon and next to its surface, as in Fig. 8, the paste-arm 15 will be in its outward position, so as to contact with it and deposit its paste in a spot upon the folded lap near to its line of fold and about equidistant from its sides. This movement of the cylinder will have brought the free rearward portion of the now partly-folded product or sheet to that point where the next fold is to be made. The tucking-blade 12 will now be projected from the folding-cylinder E and will operate to present the product or sheet to the folding-cylinder E, tucking it between the jaws 18 17 thereof. This tucking is preferably made on a transverse line which is distant from the now rearward edge of the sheet by one-third the length of the unfolded sheet or product. Simultaneously with the tucking operation the jaws 7 8 of the folding-cylinder E release their hold upon the first fold of the sheet, thus leaving the sheet entirely under the control of the folding-cylinder F. As the folding-cylinder F revolves a second fold will be formed, after which the folded sheet is presented to the pressing or laying roller 29, and both folds are acted upon thereby. After the edge of the sheet has passed between the cylinder F and the roller 29 the jaws 18 17 will be released; but the sheet will of course continue its movement, and the last ply being pressed upon the first one upon which paste has been previously deposited, as before described, a three-ply product is formed having its front and rear ends laid toward and upon each other and then pasted together. The folded and pasted product, guided by the conductors 94 95 and descending between the cylinder F and roller 29, by which it is propelled, as in Fig. 5, will be directed by the conductors 94 95 into the nip of the delivery-rollers 33 34, as in Fig. 10. These rollers will deliver the folded product into the guides $e$, which direct it to the rotary fly, where it will momentarily rest vertically upon the bottom board of the packing chute or box 92 and thereafter will be forced in a forward direction into the packing-box by the cam action of the next rearward arm of the fly X, which presses it outward until its sides elastically pass the front edges of guides $e$ of the packing-box, where it rests undisturbed until it is displaced and moved still farther outward by the arrival of the next product. In this operation it will be understood that when the leading end of the web has been fed for two-thirds of a sheet's length it is then tucked and nipped for the first fold and when the remaining one-third sheet's length follows that the web is severed on the proper cutting-line at the same point where the said first fold was made, and then while the cylinder E is making a further quarter-turn the folding-blade 12 is moved outward through the inwardly-extended cutting-slot and coacts with the nipping-jaws of the cylinder F and stands projected from the periphery of the said cylinder in proper position so as to make the last fold in the sheet and is thereafter withdrawn into said slot far enough to leave said slot free to act as a cutting-slot for the incoming web in the severance of another sheet therefrom; also, that when the forward end of a succeeding sheet's length is caught by the pin 2 and is following the course of the preceding one the cylinder E will be carrying the first once-folded sheet onward to receive its second cross or transverse fold; also, that while the cylinder E is making its revolution and the pasting-arm 15 is approaching the point where the paster P revolves the cam 24 will cause said arm 15 to stand in its forward position, so as to receive paste from the paster P, and that as soon as this is accomplished said arm 15 will be withdrawn within the cylinder-face and there remain until an appropriate time has arrived, such as when the second cross-folding action is taking place, when it will again be protruded in such a position as to apply the spot of paste in the manner described, so that when the second cross-fold is completed the otherwise free cross-folded laps of the folded product will be fastened together lightly just within the outer edge of the second cross-lap. This pasting may of course be omitted. As here arranged to operate it will be observed that the actuating-cam 24 is so shaped that the pasting-arm is projected outward to receive its paste. It is then withdrawn and held within the carrier E until the tucking has been effected, is then projected far enough to make effective contact with the folded sheet in depositing the spot of paste thereon, is then withdrawn to so pass the carrier F as not to injure the paper or itself, and then is projected to receive its charge of paste. The carriers D E F may all be one size and arranged in a straight line.

While the cutting means may be located between the printing-machine and any folding mechanism or between the longitudinal and rotating folding mechanism and must be so arranged that the first transverse folding shall be upon the rearward portion of the sheet, it is preferable to provide it in the first pair of folding-blade carriers, substantially as herein illustrated.

It will be perceived that since the pasting requisite in the production of this product is only a small spot the pasting appliance may be arranged to deposit a spot of paste upon the web at a proper point before it enters the folding mechanism and that a recess in the carrier E may then be provided, so that the paste shall not offset thereon, which recess in the case where the carrier E also carries the cutting-slot may be in the forward portion of the cutting-box in which said slot is formed; also, that other means for accomplishing this combination of pasting the folded product together may be adopted and still be within this invention.

What is claimed is—

1. In a folding mechanism, the combination with devices for folding a sheet so that its two parts shall be of unequal length, of a second set of devices for giving the sheet a fold in a direction opposite to that in which the first fold was made, the corresponding members of each set of folding devices being mounted independently of each other, substantially as described.

2. In a folding mechanism, the combination with devices for folding a sheet so that its two parts shall be of unequal length, of a second set of devices for giving the sheet a fold in a direction opposite to that in which the first fold was made, the corresponding members of each set of folding devices being mounted independently of each other, and means for applying paste to one of the folds, substantially as described.

3. In a folding mechanism, the combination with devices for folding a sheet so that its two parts shall be of unequal length, of a second set of devices for giving the sheet a fold in a direction opposite to that in which the first fold was made, the corresponding members of each set of folding devices being mounted independently of each other, and means for pressing and laying the folds, substantially as described.

4. In a folding mechanism, the combination with devices for folding a sheet so that its two parts shall be of unequal length, of a second set of devices for giving the sheet a fold in a direction opposite to that in which the first fold was made, the corresponding members of each set of folding devices being mounted independently of each other, means for applying paste to one of the folds, and means for pressing and laying the folds, substantially as described.

5. In a folding mechanism, the combination with a folding-roll, of means whereby a sheet is presented thereto so that the roll will give it a fold the two parts or plies of which are of unequal length, a second folding-roll, and means whereby the partly-folded sheet is presented to the second folding-roll so that it will be given a fold in a direction opposite to that in which the first fold was made, substantially as described.

6. In a folding mechanism, the combination with a folding-roll, of means whereby a sheet is presented thereto so that the roll will give it a fold the two parts or plies of which are of unequal length, a second folding-roll, means whereby the partly-folded sheet is presented to the second folding-roll so that it will be given a fold in a direction opposite to that in which the first fold was made, and means for applying paste to one of the folds, substantially as described.

7. In a folding mechanism, the combination with a folding-roll, of means whereby a sheet is presented thereto so that the roll will give it a fold the two parts or plies of which are of unequal length, a second folding-roll, means whereby the partly-folded sheet is presented to the second folding-roll so that it will be given a fold in a direction opposite to that in which the first fold was made, and means carried by the second folding-roll for applying paste to one of the folds, substantially as described.

8. In a folding mechanism, the combination with a folding-roll, of means whereby a sheet is presented thereto so that the roll will give it a fold the two parts or plies of which are of unequal length, a second folding-roll, means whereby the partly-folded sheet is presented to the second folding-roll so that it will be given a fold in a direction opposite to that in which the first fold was made, and means for pressing and laying the folds, substantially as described.

9. In a folding mechanism, the combination with a folding-roll, of means whereby a sheet is presented thereto so that the roll will give it a fold the two parts or plies of which are of unequal length, a second folding-roll, means whereby the partly-folded sheet is presented to the second folding-roll so that it will be given a fold in a direction opposite to that in which the first fold was made, means for applying paste to one of the folds, and means for pressing and laying the folds, substantially as described.

10. In a folding mechanism, the combination with a folding-roll, of means whereby a sheet is presented thereto so that the roll will give it a fold the two parts or plies of which are of unequal length, a second folding-roll, means whereby the partly-folded sheet is presented to the second folding-roll so that it will be given a fold in a direction opposite to that in which the first fold was made, means carried by the second folding-roll for applying paste to one of the folds, and means for pressing and laying the folds, substantially as described.

11. The combination with means for giving a sheet one or more longitudinal folds, of a set of devices for folding the sheet transversely into two parts of unequal length, and a second set of devices for giving the sheet a fold in a direction opposite to that in which the first transverse fold was made, the corresponding members of each set of folding devices being mounted independently of each other, substantially as described.

12. The combination with means for giving a sheet one or more longitudinal folds, of a set of devices for folding the sheet transversely into two parts of unequal length, a second set of devices for giving the sheet a fold in a direction opposite to that in which the first transverse fold was made, the corresponding members of each set of folding devices being mounted independently of each other, and means for applying paste to one of the folds, substantially as described.

13. The combination with means for giving a sheet one or more longitudinal folds, of a set of devices for folding the sheet transversely into two parts of unequal length, a second set of devices for giving the sheet a fold in a direction opposite to that in which the first transverse fold was made, the corresponding members of each set of folding devices being mounted independently of each other, and means for pressing and laying the folds, substantially as described.

14. The combination with means for giving a sheet one or more longitudinal folds, of a set of devices for folding the sheet transversely into two parts of unequal length, a second set of devices for giving the sheet a fold in a direction opposite to that in which the first transverse fold was made, the corresponding members of each set of folding devices being mounted independently of each other, means for applying paste to one of the folds, and means for pressing and laying the folds, substantially as described.

15. In a folding mechanism, the combination with a longitudinal folder operating to give a sheet one or more folds in the direction of its length, of a folding-roll, means for presenting the partially-folded sheet to the roll so that the roll may fold it transversely into two plies of unequal length, a second folding-roll, and means whereby the longer ply is given a fold in a direction opposite to that in which the first transverse fold was made, substantially as described.

16. In a folding mechanism, the combination with a longitudinal folder operating to give a sheet one or more folds in the direction of its length, of a folding-roll, means for presenting the partially-folded sheet to the roll so that the roll may fold it transversely into two plies of unequal length, a second folding-roll, means whereby the longer ply is given a fold in a direction opposite to that in which the first transverse fold was made, and means for applying paste to one of the folds, substantially as described.

17. In a folding mechanism, the combination with a longitudinal folder operating to give a sheet one or more folds in the direction of its length, of a folding-roll, means for presenting the partially-folded sheet to the roll so that the roll may fold it transversely into two plies of unequal length, a second folding-roll, means whereby the longer ply is given a fold in a direction opposite to that in which the first transverse fold was made, means for applying paste to one of the folds, and means for pressing and laying the folds, substantially as described.

18. In a folding mechanism, the combination with a longitudinal folder operating to give a sheet one or more folds in the direction of its length, of a folding-roll, means for presenting the partially-folded sheet to the roll so that the roll may fold it transversely into two plies of unequal length, a second folding-roll, means whereby the longer ply is given a fold in a direction opposite to that in which the first transverse fold was made, means carried by the second folding-roll for applying paste to one of the folds, and means for pressing and laying the folds, substantially as described.

19. The combination with a longitudinal-folding mechanism, of a cutting mechanism, a transverse-folding mechanism operating to fold the sheet into two plies of unequal length, and a second transverse-folding mechanism operating to give the partly-folded product a second fold in a direction opposite to that in which the first fold was made the corresponding members of each set of transverse-folding mechanisms being mounted independently of each other, substantially as described.

20. The combination with a longitudinal-folding mechanism, of a cutting mechanism, a transverse-folding mechanism operating to fold the sheet into two plies of unequal length, a second transverse-folding mechanism operating to give the partly-folded product a second fold in a direction opposite to that in which the first fold was made, the corresponding members of each set of transverse-folding mechanisms being mounted independently of each other and means for applying paste to one of the folds, substantially as described.

21. The combination with a longitudinal-folding mechanism, of a cutting mechanism, a transverse-folding mechanism operating to fold the sheet into two plies of unequal length, a second transverse-folding mechanism operating to give the partly-folded product a second fold in a direction opposite to that in which the first fold was made the corresponding members of each set of transverse-folding mechanisms being mounted independently of each other, means for applying paste to one of the folds, and means for pressing and laying the folds, substantially as described.

22. The combination with a longitudinal-folding mechanism, of a cutting mechanism, a transverse-folding mechanism operating to fold the sheet into two plies of unequal length, a second transverse-folding mechanism operating to give the partly-folded product a second fold in a direction opposite to that in which the first fold was made the corresponding members of each set of transverse-folding mechanisms being mounted independently of each other, means carried by the second folding-roll for applying paste to one of the folds, and means for pressing and laying the folds, substantially as described.

23. In a folding mechanism, the combination with a carrier provided with a tucking-blade, of a second carrier provided with nipping-jaws, the blade operating to tuck a sheet between the jaws on a line unequally distant from the ends of the sheet, and the carrier operating to fold the sheet, a tucking-blade on the second carrier, a third carrier provided with nipping-jaws, the said blade acting to tuck the partially-folded sheet into said jaws, and the third carrier operating to give it a fold in a direction opposite to that given it by the second carrier, and a cutting mechanism, substantially as described.

24. In a folding mechanism, the combination with a longitudinal folder, of a rotating carrier provided with a tucking-blade, a second carrier provided with nipping-jaws, the blade operating to tuck a sheet between the jaws on a line unequally distant from the ends of the sheet, and the carrier operating to fold the sheet, a tucking-blade on the second carrier, a third carrier provided with nipping-jaws, the said blade acting to tuck the partially-folded sheet into said jaws, and the third carrier operating to give it a fold in a direction opposite to that given it by the second carrier, and a cutting mechanism, substantially as described.

25. The combination with a rotary printing-machine, of a rotating carrier provided with a tucking-blade, a second carrier provided with nipping-jaws, the blade operating to tuck a sheet between the jaws on a line unequally distant from the ends of the sheet, and the carrier operating to fold the sheet, a tucking-blade on the second carrier, a third carrier provided with nipping-jaws, the said blade acting to tuck the partially-folded sheet into said jaws, and the third carrier operating to give it a fold in a direction opposite to that given it by the second carrier, and a cutting mechanism, substantially as described.

26. The combination with a rotary printing-machine, of a longitudinal folder, a rotating carrier provided with a tucking-blade, a second carrier provided with nipping-jaws, the blade operating to tuck a sheet between the jaws on a line unequally distant from the ends of the sheet, and the carrier operating to fold the sheet, a tucking-blade on the second carrier, a third carrier provided with nipping-jaws, the said blade acting to tuck the partially-folded sheet into said jaws, and the third carrier operating to give it a fold in a direction opposite to that given it by the second carrier, and a cutting mechanism, substantially as described.

27. In a cutting and folding mechanism, the combination with a carrier provided with a tucking-blade and one member of a cutting mechanism, of a second carrier coöperating therewith and provided with nipping-jaws, a tucking-blade and the other member of the cutting mechanism, the cutting members operating to sever a sheet and the tucking-blade operating to tuck the sheet between the nipping-jaws on a transverse line unequally distant from the ends of the sheet, and a third rotating carrier provided with nipping-jaws, the said jaws receiving the sheet from the tucking-blade of the second carrier and giving it a fold in a direction opposite to that in which the first fold was made, substantially as described.

28. The combination in a cutting and folding mechanism, with a longitudinal folder, of a carrier provided with a tucking-blade and one member of a cutting mechanism, a second carrier coöperating therewith and provided with nipping-jaws, a tucking-blade and the other member of the cutting mechanism, the cutting members operating to sever a sheet and the tucking-blade operating to tuck the sheet between the nipping-jaws on a transverse line unequally distant from the ends of the sheet, and a third rotating carrier provided with nipping-jaws, the said jaws receiving the sheet from the tucking-blade of the second carrier and giving it a fold in a direction opposite to that in which the first fold was made, substantially as described.

29. The combination with a rotative carrier provided with a tucking-blade, a coöperating rotative carrier provided with nipping-jaws and a tucking-blade, and a third rotative carrier provided with nipping-jaws coöperating with the last-named tucking-blade, of a pasting mechanism consisting of a pasting-arm 15 and means for vibrating it within the carrier E and operating to deposit paste upon the sheet whereby each sheet length is folded twice transversely, its front and rear portions are lapped toward each other upon the same side of its body and the outermost lap is secured near its cut end to the first-folded lap, substantially as described.

30. In a combined folding and cutting mechanism, the combination with the slotted cutting-box, of a tucking or folding blade operating through the same and provided with means to expose the outward part of the slot for the cutting operation and to protrude the blade through the same for the tucking or folding operation, substantially as described.

31. In a rotating cutting and folding mechanism, the combination of three carriers, cutting devices the coöperating members of which are located upon two of the carriers, tucking-blades located upon two of the carriers, and nipping-jaws located upon two of the carriers, the tucking-blade of one of the carriers operating through the cutting-slot thereof, substantially as described.

32. In a rotative folding mechanism wherein the folding operation is performed by a tucking-blade and nipping-jaws, the combination with said blade, of springs located in the rear of the blade whereby said blade may slightly move rearward circumferentially as it meets said jaws, substantially as described.

In testimony whereof I have hereunto set my hand in the presence of two subscribing witnesses.

E. P. SHELDON.

Witnesses:
F. W. H. CRANE,
E. L. SPEIR.